United States Patent
Jung (10) Patent No.: US 10,166,639 B2
(45) Date of Patent: Jan. 1, 2019

(54) SYSTEM FOR CHANGING AND INSERTING TOOLS INTO OR PRESENTING TOOLS AT A MACHINE TOOL AND TOOL MAGAZINE, ALSO MACHINE TOOL HAVING A TOOL CHANGING SYSTEM OR TOOL MAGAZINE

(75) Inventor: Robert Jung, Pfronten (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 622 days.

(21) Appl. No.: 14/342,399

(22) PCT Filed: Aug. 31, 2012

(86) PCT No.: PCT/EP2012/067026
§ 371 (c)(1),
(2), (4) Date: May 30, 2014

(87) PCT Pub. No.: WO2013/030373
PCT Pub. Date: Mar. 7, 2013

(65) Prior Publication Data
US 2014/0296047 A1    Oct. 2, 2014

(30) Foreign Application Priority Data

Sep. 2, 2011    (DE) .................. 10 2011 082 050

(51) Int. Cl.
*B23Q 3/157*    (2006.01)
*B23Q 3/155*    (2006.01)

(52) U.S. Cl.
CPC ..... *B23Q 3/15713* (2013.01); *B23Q 3/15526* (2013.01); *B23Q 3/15539* (2016.11);
(Continued)

(58) Field of Classification Search
CPC ........... Y10T 483/1748; Y10T 483/175; Y10T 483/1845; Y10T 483/1855;
(Continued)

(56) References Cited

U.S. PATENT DOCUMENTS 3,273,235 A * 9/1966 Dziedzic ............ B23Q 3/15773
483/48
4,156,962 A    6/1979 Haller
(Continued)

FOREIGN PATENT DOCUMENTS

DE    39 05 780 C1    1/1990
DE    41 160 91 CI    8/1992
(Continued)

OTHER PUBLICATIONS

Office Action Issued in Chinese Patent Application No. 201280042849.4; dated Oct. 13, 2015.*
(Continued)

*Primary Examiner* — Erica E Cadugan
*Assistant Examiner* — Michael Vitale
(74) *Attorney, Agent, or Firm* — Oliff PLC (57) ABSTRACT

A system is provided for changing and inserting tools into or presenting tools at a machine tool. The system includes at least n rotatable tool magazines for receiving a plurality of tools, where n≥2, which are arranged in tandem in the direction of a rotational axis. At least one of the n tool magazines can be driven independently of the other tool magazines to perform a rotational movement about the rotational axis. The system further includes a manipulator for removing the tools from the magazine. The tools are held in tool mounts along the circumference of the n tool magazines such that the longitudinal axes of the tools in each case of one of the n tool magazines are located in one plane and project from the circumference of the tool magazine, and the tools can be moved along the circumference of the respective tool magazine.

13 Claims, 4 Drawing Sheets

(52) U.S. Cl.
CPC ...... *B23Q 3/15722* (2016.11); *B23Q 3/15733* (2013.01); *B23Q 2003/155418* (2016.11); *B23Q 2003/155428* (2016.11); *B23Q 2003/155446* (2016.11); *Y10T 483/17* (2015.01); *Y10T 483/175* (2015.01); *Y10T 483/1771* (2015.01); *Y10T 483/18* (2015.01); *Y10T 483/1845* (2015.01); *Y10T 483/1882* (2015.01)

(58) Field of Classification Search
CPC ........ Y10T 483/1873; Y10T 483/1882; Y10T 483/1783; Y10T 483/1786; Y10T 483/1788; B23Q 3/15526; B23Q 3/15733; B23Q 3/15573; B23Q 3/15713; B23Q 2003/155404; B23Q 2003/155407; B23Q 2003/155435; B23Q 2003/155439
USPC ......... 483/36, 37, 63, 64, 66, 67, 51, 52, 53
See application file for complete search history.

(56) References Cited

U.S. PATENT DOCUMENTS

| | | | | |
|---|---|---|---|---|
| 4,344,221 A | * | 8/1982 | Pagani | ............... B23Q 3/15526 483/39 |
| 4,394,908 A | | 7/1983 | Pinchemaille | |
| 4,558,506 A | * | 12/1985 | Kielma | ................ B23B 31/265 29/33 P |
| 4,625,387 A | * | 12/1986 | Stoilov | .............. B23Q 3/15526 483/37 |
| 4,649,622 A | * | 3/1987 | Scott | .................... B21D 37/145 294/86.4 |
| 2007/0167303 A1 | | 7/2007 | Schmauder | |

FOREIGN PATENT DOCUMENTS

| | | |
|---|---|---|
| DE | 197 08 096 A1 | 9/1998 |
| DE | 103 34 346 A1 | 3/2005 |
| DE | 10 2004 028 151 A1 | 12/2005 |
| DE | 10 2005 052 353 A1 | 5/2007 |
| DE | 10 2009 008 647 A1 | 9/2010 |
| JP | A-60-099541 | 6/1985 |

OTHER PUBLICATIONS

Office Action Issued in Japanese Patent Application No. 2014-527684; dated Apr. 6, 2016.*
Partial English-language translation of Office Action issued in German Application No. 10 2011 082 050.7 dated Jul. 5, 2012.
International Search Report issued in International Application No. PCT/EP2012/067026 dated Jan. 11, 2013.
English-language translation of International Preliminary Report on Patentability issued in International Application No. PCT/EP2012/067026 dated Mar. 4, 2014.
May 18, 2016 Office Action issued in European Patent Application No. 12751550.0.
Oct. 13, 2015 Office Action issued in Chinese Patent Application No. 201280042849.4.
Apr. 6, 2016 Office Action issued in Japanese Patent Application No. 2014-527684.

* cited by examiner

SYSTEM FOR CHANGING AND INSERTING TOOLS INTO OR PRESENTING TOOLS AT A MACHINE TOOL AND TOOL MAGAZINE, ALSO MACHINE TOOL HAVING A TOOL CHANGING SYSTEM OR TOOL MAGAZINE

The present invention relates to a system for changing and inserting tools into or presenting tools at a machine tool and to a tool magazine, and also relates to a machine tool for machining a workpiece having a tool changing system or tool magazine.

BACKGROUND OF THE INVENTION

Systems for changing and inserting tools into or presenting tools at a machine tool and tool magazines for provisioning tools of a machine tool are known in various configurations from the prior art. Tool changing systems are used in milling machining systems, for example, to reduce the idle time of the respective processing machine, for example what is known as chip-to-chip time.

By means of tool changing systems of this type, tools are changed over, as required, from the tool magazine to a machining spindle of a machine tool, and vice versa. If appropriate, this takes place in a fully automated and program-controlled manner. For this purpose, the tool magazines accommodate a plurality of tools for the provisioning thereof and also comprise a manipulator for removing the tools from the magazine, said manipulator also being able to deliver the tools to a machine tool.

In this respect, two fundamental types of tool magazine in particular are known from the prior art which differ from one another in that either the tools are stored in a stationary, unmovable tool mount and a movable manipulator travels to the storage position of the tool to remove the tool therefrom by means of a removal device, or the receiving means for storing or receiving the tools is moved to a predetermined removal position in which the required tool is removed by the removal device of the stationary manipulator.

For example, chain magazines for machine tools having a rigid manipulator are known from the prior art, for example from DE 39 05 780 C1 and DE 10 2005 052353 A1. Chain magazines of this type comprise a chain which comprises along its course a plurality of receiving means or receiving portions for receiving tools, the chain being at least partly guided along a guide rail.

However, for the flexible machining of workpieces in modern machining centres, it is necessary in particular to provide a large number of different tools in one tool magazine and the problem arises in the case of the chain magazines described above that in order to store a large number of tools, either a plurality of chains or chain magazines has to be provided, or unfavourably long chains have to be provided. This means that a large set-up area is required for the chain magazine, and furthermore long tool provision times possibly arise in the case of chain magazines if a tool which is accommodated in the chain of the magazine at a distance from the manipulator is to be removed from the magazine.

The prior art also discloses rack magazines having rigid receiving means and a controllable removal device for removing the tools, described for example in DE 10 334 346 A1.

However, rack magazines of the prior art suffer from the problem that for storing a large number of different tools, subject to the tool provisioning and the control possibilities by the removal device of a manipulator, long tool provision times possibly arise and, in the same way, large set-up areas for the rack magazine are required.

DE 10 2004 028 151 A1 discloses a storage arrangement for processing machines with superimposed storage trays, on the lower side of which tool mounts are attached which are arranged in the shape of a circle and from which tools can be removed by a movable gripper arm. The gripper arm removes the tools in a direction vertical to the mounted tool axis and radially inwards. A tool magazine of a similar construction is described in DE 41 16 091 C1. In this case as well, the tool mounts are arranged in a circle and are removed radially inwards by a changing device arranged centrally to the arc of the circle. Likewise, DE 10 2009 008 647 A1 describes a tool changing system in which the tools are mounted inside the tool magazine on different planes in storage compartments which are arranged along an arc of a circle.

U.S. Pat. No. 4,394,908 A discloses a tool magazine in which tools are mounted along the circumference of two circular receiving discs arranged one above the other in the radial direction. The tools are stored in receiving containers, the receiving containers and the tools of the upper disc being tilted with respect to the receiving containers and the tools of the lower disc. A disadvantage of this tool magazine is that in order to remove a tool from the upper disc, the appropriate container must firstly be lowered into a free position of the lower disc, because the tool changer can only remove the tools in a predetermined changing position. This increases the tool changing times. Furthermore, the construction mechanism only functions with a maximum of two superimposed discs and does not scale thereto. Thus, the receiving space for tools is restricted.

On the other hand, DE 197 08 096 A1 discloses a machining centre comprising a tool store from which the tools are delivered directly to the working spindle radially outwards without the provision of a manipulator which firstly removes the tools from the magazine and then delivers them to the working spindle.

Similarly to chain magazines, circular-type or column-type tool magazines of this kind can store a large number of tools with faster access times to the tools compared to rack magazines. However, rack magazines still have to be frequently used in practice if, due to the restricted positioning space next to a machine tool, only one narrow rack magazine can be used.

US 2007/0 167 303 A1 discloses a tool magazine in which the tools are mounted displaceably along an arc of a circle and the tools are arranged in a plane perpendicular to a floor space. Two tools in each case can be stored in a double mount along the circular circumference. A disadvantage of this tool magazine is presented by the long tool changing times, because tools on the side opposite the tool changer can only be changed by repeated alternating rotational movements of the wheel magazine and travel movements of the manipulator. Furthermore, the receiving capacity is restricted because the described tool change can only be implemented for a single wheel magazine.

SUMMARY OF THE INVENTION

It is thus an object of the invention to provide a system for changing and inserting tools into or presenting tools at a machine tool, a tool magazine for storing tools and a machine tool for machining a workpiece having a system for changing and inserting tools into or presenting tools at the machine tool, in which the above-mentioned problems of the chain, rack and circular magazines known from the prior art are resolved.

In particular, it is a further object of the invention to provide a system for changing and inserting tools into or presenting tools at a machine tool, a tool magazine with compact dimensions for receiving tools and a machine tool having a system for changing and inserting tools into or presenting tools at the machine tool, in which a large number of tools of different types and sizes can be received for storage and short tool provision times for the accommodated tools are made possible.

The objects described above are achieved according to the invention by a system for changing and inserting tools into or presenting tools at a machine tool according to claim 1, by a tool magazine according to claim 14 and by a machine tool having a system for changing and inserting tools into or presenting tools at the machine tool according to claim 15. Preferred embodiments of the invention are described in the dependent claims.

A system for changing and inserting tools into or presenting tools at a machine tool according to the present invention comprises at least one rotatable tool magazine for receiving a plurality of tools, in which the tools are held in tool mounts along the circumference of the tool magazine such that the longitudinal axes of the tools are located in a plane within a rotatable tool magazine and project from the circumference of the tool magazine, the tools being able to be displaced along the circumference of the tool magazine to move into a position suitable for removal. The tool changing system also comprises a manipulator for removing the tools from the tool magazine.

This arrangement provides a space-saving construction of the tool magazine, the width of which is substantially determined by the width of the tools. The tools are preferably moved within the plane in which the longitudinal axes of the tools are located. The tools are preferably received into the tool mounts at a first end region of their longitudinal axes, i.e. at a first longitudinal end, so that a second opposite end region, i.e. the opposite longitudinal end of the tools projects outwards or inwards. The tools are locked in this position. in other words, the tools are mounted only at one end point on the circumference of the tool magazine.

The system according to the invention for changing and inserting tools, having a tool magazine in which the tools are mounted along the circumference of the magazine and project from the circumference, allows a particularly light and slim construction of the tool magazine at the same time with a high tool density because no additional compartments or other storage areas are required for receiving the tool body.

In order to be able to arrange the tools as compactly as possible on the circumference, the tools preferably project outwards or inwards from the circumference of the tool magazine such that their longitudinal axes form a normal vector to the circumference of the magazine. In other words, the tools are arranged in the longitudinal direction preferably orthogonally to the outer circumferential line of the magazine so that the longitudinal axis of the tools stands vertically on the tangential vector at the point at which the tool is mounted on the circumference in the tool mount.

The tools preferably project outwards with the longitudinal end which is not attached to the circumference of the tool magazine. The star-shaped arrangement of the tools, projecting from the outer circumference of the wheel magazine also provides those tools, the body of which is of a relatively great diameter, with sufficient space and optimally utilises the space outside the outer circumference of the tool magazine.

The manipulator is preferably arranged laterally and externally with respect to the tool magazine. As a result, the externally arranged manipulator for removing the tools from the magazine can be advantageously positioned between the tool magazine and the spindle of the machine tool. In connection with the rotatable magazine which can provide the required tool in a predetermined removal position, short, simple delivery paths for the manipulator from the tool magazine to the tool spindle are produced thereby.

The tool magazine is preferably arranged such that the plane spanned by the longitudinal axes of the tools is oriented vertically to a floor space. In other words, the flat tool magazine stands upright and can thereby be arranged on the longitudinal side of a machine tool. This allows a particularly compact overall width or set-up area (footprint) of the tool changing system or of a system consisting of machine tool and the tool changing system according to the invention, since the width of the tool magazine according to the invention is not determined by the diameter thereof, as is the case in conventional horizontal systems, but is substantially determined by the width of the tools, since they are arranged in a plane in the longitudinal direction and are attached to the outer circumference of the tool magazine without compartments or other cumbersome mounts.

Consequently, it is also possible to use a tool changing system with a circumferential tool storage for the first time in conjunction with machine tools, in which hitherto it has only been possible to use rack systems for changing tools due to the limited positioning area next to the machine tool.

The tools are preferably held in the tool mounts by means of a locking connection, a catch mechanism or a coupling mechanism. This has the advantage that the tools can be mounted on the wheel magazine in a compact manner next to one another without additional gaps, compartments or other storage elements. The invention is not restricted to these connecting mechanisms; any releasable connecting mechanism which allows the tools to be locked securely in their mounting positions on the circumference of the tool magazine so that when the magazine is rotated, the tools are securely attached thereto and at the same time can be removed quickly and easily by a manipulator, can be used for the tool changing system according to the invention. Furthermore, the tool mounts can be realised as separate tool mounts which are secured on the outer circumference of the tool magazine, or as tool mounts which are integrated into or moulded into the tool magazine, or they can be realised by coupling pieces.

The tool magazine is preferably configured as a wheel magazine in which the tools are held in tool mounts along the circumference of the wheel magazine such that the longitudinal axes of the tools project outwards in a radial direction from the outer circumference of the wheel magazine. This means that the tools are arranged along the circumference of the wheel magazine such that the imaginary extensions of the longitudinal axes of the tools intersect in the centre of the wheel magazine. The ends of the longitudinal axes of the tools which are not mounted on the outer circumference of the wheel magazine project outwards therefrom in the form of a star. The wheel magazine is preferably configured annularly or as an annular hollow cylinder. The circular shape allows a high tool density along the outer circumference with compact dimensions and fast access times, as well as a light and cost-effective construction.

Furthermore, the wheel magazine is preferably arranged such that the rotational axis of the wheel magazine is oriented parallel to a floor space. In other words, the wheel magazine stands upright and consequently can be arranged on the longitudinal side of a machine tool. This again allows a particularly compact overall width of a system of machine tool and the tool changing system according to the invention, since the width of the tool magazine according to the invention is substantially determined by the narrow width of the wheel magazine and not by the diameter thereof, as is the case in conventional horizontal systems.

In an advantageous embodiment, the tool changing system according to the invention comprises at least n tool magazines, where n≥2, which are arranged in tandem, so that the planes which are spanned by the longitudinal axes of the tools of each magazine are parallel to one another. In this respect, these n tool magazines can be configured as n wheel magazines which are arranged in tandem in the direction of the rotational axis. Due to an arrangement of this type, the tool density can be increased as desired by each additional tool magazine or wheel magazine, with the overall width increasing only slightly. With each additional tool magazine, the overall width of the arrangement only increases by the width of the flat tool magazine, for example by the width of the wheel magazine which, in turn, is substantially determined only by the tool width, because no cumbersome rack elements surrounding the tool bodies are required.

A further advantage of the invention is that each of the n tool magazines can be driven by one or more drives independently of the other tool magazines to perform a rotational movement. This has the advantage that only the magazine, for example only the wheel magazine which contains the desired tool has to be moved. Furthermore, during predetermined production runs in which the sequence of the required tools is predetermined, the various tool magazines can already be rotated in the direction of the spindle such that the required tools are already positioned at or near the removal position by the manipulator in order to further reduce the changing times.

The radii of the n wheel magazines are advantageously substantially the same size. This means that the paths of the manipulator from its rest position to a tool changing position are kept as short as possible. However, it is also possible to store tools with different dimensions on wheel magazines having different diameters.

The n tool magazines preferably have a free place without tools in one location on the outer circumference, with the exception of at most one of the outer tool magazines. The size or number of free places depends on the dimensions of the manipulator. The free places can be configured as recesses in the circumference of the tool magazine or by unequipped tool places. In order to remove a tool in the m-th tool magazine, at least the magazines arranged between the m-th magazine and the manipulator are preferably rotated about the rotational axis such that their free places allow the manipulator to access the m-th magazine.

The n tool magazines can advantageously have a free place without tools in one location on the circumference, with the exception of at most one of the outer tool magazines. The size or number of frees places depends on the dimensions of the manipulator. The free places can be configured as recesses in the circumference of the tool magazine or by unequipped tool places. in order to remove a tool in the m-th tool magazine, at least the magazines arranged between the m-th magazine and the manipulator along the rotational axis are rotated about the rotational axis such that their free places allow the manipulator to access the m-th magazine along the rotational axis.

The manipulator can be moved sideways in the direction of the rotational axis as far as the m-th tool magazine through the resulting "hole" in the tool arrangement, to then remove the required tool of the m-th tool magazine by a radial gripping movement and to then move out again sideways from the tool magazine through the access. Consequently, it is possible to remove a tool from the magazine and to return the tool to the magazine with only a linear movement. For example, the manipulator only has to be moved sideways at the most as far as the m-th tool magazine, but not further than this. Each tool can be removed from each magazine by a 2-point sideways movement (linear movement). In this case, the manipulator moves sideways outside the magazine from its parking position or tool transfer position as far as or at the most as far as the m-th magazine along the passage of the free places and back.

This has the advantage that the manipulator can reach any tool in the magazine with a fast, preferably linear movement. This shortens the transportation paths of the manipulator and thereby the tool changing times. In addition, a more compact overall size is provided, because the manipulator can be positioned on the side of the magazine.

More precisely, the configuration according to the invention having a plurality of tool magazines which are arranged one behind another and are rotatable independently of one another in which the tools as arranged, as described above, makes it possible to very significantly increase the number of tools which can be reached by the manipulator within a predetermined (short) period of time and/or during a predetermined (short) displacement path of the manipulator from the removal position of the tool at the tool magazine right up to a transfer position of the manipulator to a transfer means or directly to the working spindle, compared to all the previously known tool magazines of the prior art.

By configuring the tool magazines with free places, as described above, it is possible to further shorten the required removal time and/or the required displacement path of the manipulator, and the displacement path is also simplified.

Each of the n tool magazines can preferably be removed, for example in a direction perpendicular to the plane of the tool longitudinal axes, i.e. in a direction in which the tool magazines are "stacked" one behind another. This enhances flexibility and shortens the time for equipping the tool changer. While the tool magazine is being re-stocked, the tool changing machine according to the invention can continue to function in main operation, so that unnecessary down times can be significantly reduced. The tool changing system according to the invention thereby affords a "magazine in a magazine", because the modular construction with the wheel magazines arranged in tandem allows a fast and flexible expansion of the tool magazine.

The configuration of the tool magazine in which the tools project outwards from the outer circumference of the magazine is a preferred embodiment, in which the tools can he attached as closely as possible at an end point of their longitudinal axis along the outer circumferential line. To reduce the overall diameter of the magazine, the tools can also be arranged on the circumference such that they project inwards from the circumference. In this embodiment, the tools are preferably attached to the circumference of the magazine at a slightly greater distance from one another.

The configuration of the tool magazine as a rigid ring or as a wheel magazine is a preferred embodiment. Naturally however, it is not important for the outer circumference to he configured annularly. Thus, when a chain drive is used in which the tool mounts are attached to the chain, the tools can be moved by the chain drive into every position along the outer circumferential line. It is thereby possible for the outer circumference of the tool magazine to assume any other circumferential shape, subject to the chain guidance. For example, the circumferential shape can consist of straight portions (in the case of a triangular or square shape) or of curved portions (in the case of a circular or elliptic shape). In contrast to conventional chain magazines, the longitudinal axes of the tools project outwards or inwards in a radiated manner, i.e. their longitudinal axes are directed outwards or inwards from the circumferential direction formed by the chain and are located in a plane.

Furthermore, the tools can be moved along the outer circumference of the tool magazine such that they perform a 360° rotational movement. Alternatively, the rotational movement of the tool magazine can also be configured such that the tools can only be moved along part of the outer circumference, for example in a 180° angular region. In this case, the tool magazine would have, to be rotated in a clockwise direction and in an anticlockwise direction to move all the tools to a predetermined removal position if the manipulator is configured to only ever remove the tools at a predetermined removal position. Alternatively, the manipulator can also be configured to remove the tools at a plurality of predetermined removal positions, so that the magazine preferably only has to be rotated once into the closest removal position for the required tool.

A tool magazine for storing a plurality of tools according to the present invention is characterised in that the tool magazine is configured as a tool magazine of one of the systems described above for changing and inserting tools into or presenting tools at a machine tool.

A machine tool for machining a workpiece according to the present invention comprises a tool changing device for changing a tool at the machine tool and one of the systems described above for changing and inserting tools into or presenting tools at the machine tool, the manipulating device of the tool magazine being capable of delivering a tool from the magazine to the tool changing device.

The summary of the invention provided above substantially describes the removal of tools stored in the tool magazine and the delivery of a tool to a tool changing device for exchanging the tools at the machine tool. However, the system according to the invention for changing and inserting tools into or presenting tools at the machine tool, the tool magazine according to the invention and the machine tool according to the invention is also configured preferably analogously to the removal and delivery of tools described above to deliver tools to the wheel magazines of the tool magazine for storage from the machine tool or from the tool changing device by controlling or displacing the removal device.

DETAILED DESCRIPTION OF THE FIGURES AND PREFERRED EMBODIMENTS OF THE PRESENT INVENTION

In the following, preferred embodiments of the present invention will be described in more detail by way of example with reference to the accompanying drawings.

Figure 1:
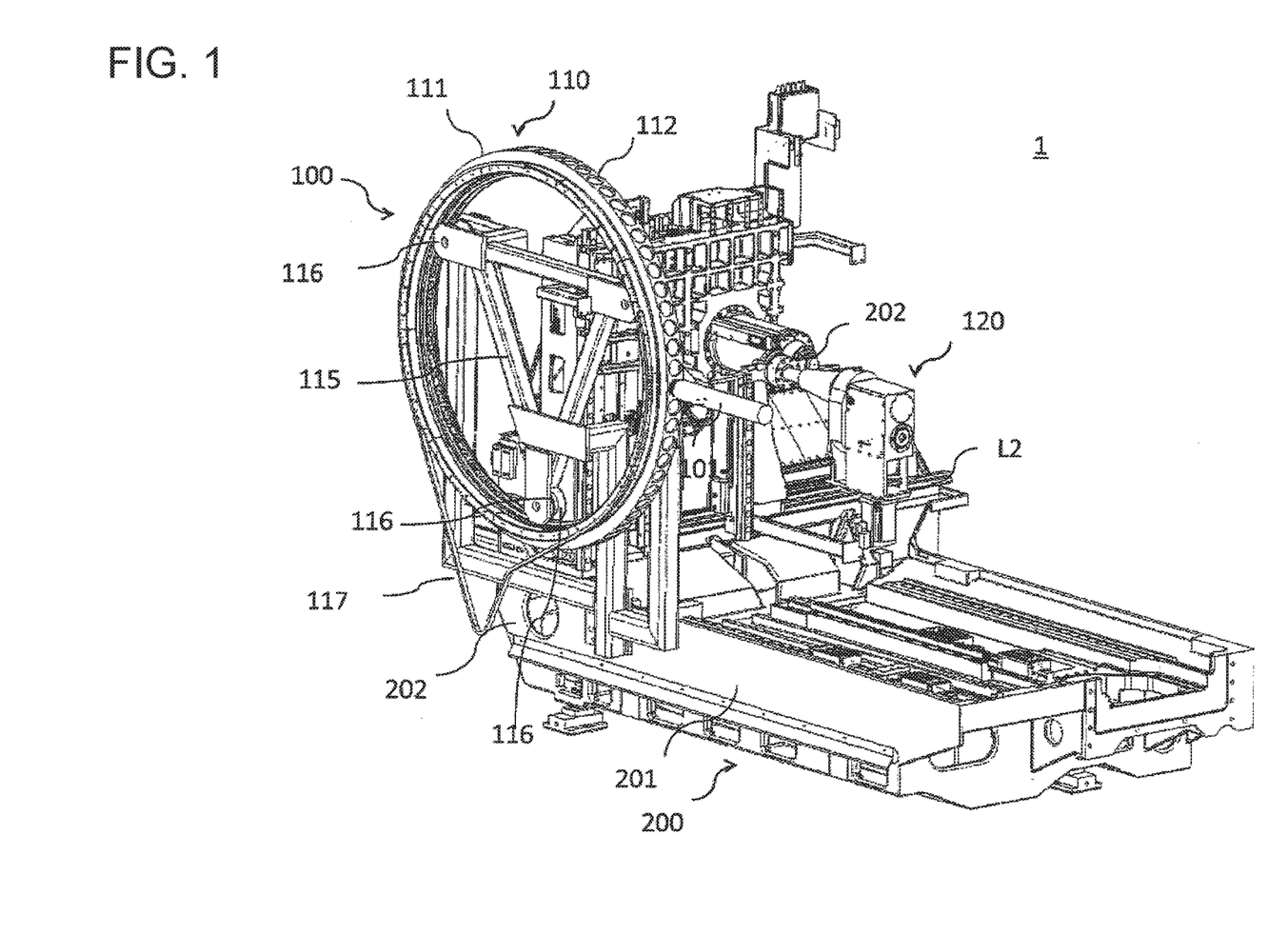
FIG. 1 is a perspective view of a system for changing and inserting or presenting tools according to an embodiment of the present invention.

FIG. 1 shows an embodiment of the system 1 according to the invention for changing and inserting tools into or presenting tools at a machine tool, in which the tool magazine is configured as a wheel magazine. To illustrate the construction principle, the tool magazine and the manipulator of FIG. 1 are again shown in Fig. 2 without a machine tool.

The system 1 comprises a tool magazine 100 which, in the embodiment shown here, has an annular wheel magazine 110 in which a plurality of tools 101 can be stored in each case for provisioning.

The tools 101 are mounted at an end point 102 along the circumference 111 of the wheel magazine 110. The wheel magazine is configured as an annular hollow cylinder. Located along the circumference 111 of the wheel magazine 110, i.e. along the outer lateral surface, are tool mounts 112 which can enter into a releasable connection with the tools 101. In FIG. 1, the tool mounts 112 are arranged as hole structures along the outer lateral surface of the wheel magazine, which provides a particularly simple mode of construction. The tools are locked in the mounts 112 by centrifugal force and gravitational force. In the present example, for this purpose an active locking by a catch connection with the tools is realised, in which the tools are forcibly locked in a positive connection. To fasten the tools 101 in the tool mounts 112, a self-retaining hollow shank taper (HSK) with a flat contact surface is used as the interface (not shown in the figures). Alternatively, a steep angle taper or a Morse taper can be used.

Figure 2:
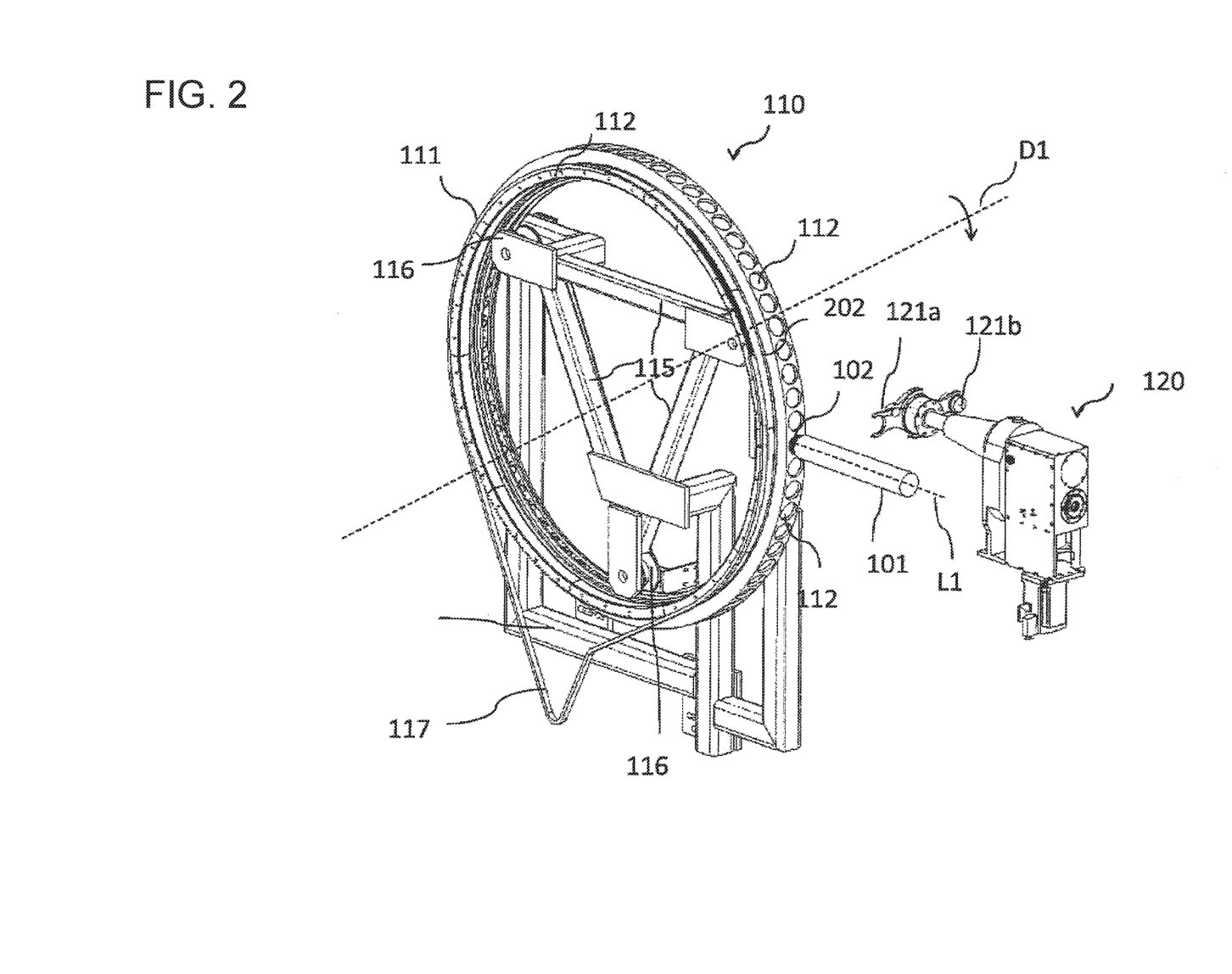
FIG. 2 is a perspective view of a system for changing and inserting or presenting tools without a tool magazine according to an embodiment of the present invention.

The tools are thus only attached at one of their longitudinal ends 102 to the outer circumference of the wheel magazine 110, so that they project outwards in a radiated manner from the outer circumference of the wheel magazine in the radial direction. Consequently, the longitudinal axes of the tools are located in one plane, as illustrated in FIG. 2 by a dashed line L1. As a result, the tools can be arranged next to one another in an extremely compact and close manner along the circumference 111 of the wheel magazine 110.

The wheel magazine can be equipped with all current tools for non-cutting and cutting production. To illustrate the construction principle, FIG. 1 shows only one fitting with a tool 101.

In the present embodiment, the wheel magazine has 63 tool mounts, but during normal operation is only equipped with 60 tools. The function of the resulting free places will be described in more detail in connection with the use of a plurality of wheel magazines (see FIG. 3).

The wheel magazine is mounted by means of a triangular frame 115, at the three end points of which a respective running wheel 116 is arranged. A four-point or multi-point mounting is also possible in addition to the three-point mounting shown here. The wheel magazine can also be mounted by a centre axle instead of by the triangular frame 115. The wheel magazine 110 is rotated by a chain drive, merely the driving chain 117 being shown in FIG. 1. Instead of the chain drive shown here, the wheel magazine 110 can also be driven directly by a pinion or by frictional locking.

The system further comprises a manipulator 120 for removing the tools 101 from the tool magazine 100 so that they can be delivered to a working spindle 202 of a machine tool 200. The machine tool 200 can be a machine tool known from the prior art for cutting or non-cutting production. The system for changing and inserting or presenting tools is particularly advantageous for universal machining centres, since they have to be equipped in a flexible manner with many different tools. An arrangement which is as compact as possible is obtained when the tool magazine 100 is positioned sideways on the bed 201 and frame 203 in an upright position to allow short delivery paths of the manipulator 120 to the spindle 202. Due to the possibility of an upright positioning of the wheel magazines 110, the tool changing system can almost always be positioned as closely as possible to the spindle even in the case of different frames and bed shapes.

The manipulator 120 of the tool magazine 100 is arranged externally with respect to the unequipped wheel magazine 110, i.e. is arranged outside the circumference of the wheel magazine 110, so that it can remove the tools 101 outwards from the wheel magazine 110 in the direction of the rotational axis of the wheel magazine and/or in a radial direction. The manipulator illustrated schematically here comprises a first linear axis L2 which is capable of moving the manipulator in the direction of the rotational axis D1 of the wheel magazine, i.e. In a lateral direction to the wheel magazine, in order to perform a horizontal movement between spindle 202 and wheel magazine 110. The manipulator 120 can also have a second linear axis (not shown) which is capable of moving the manipulator in the tool-changing position in a radial direction on the wheel magazine.

In the illustrated embodiment, for removing the tools 101 the manipulator 120 is configured as a sword changer with a double gripper, having a left-hand mount 121a and a right-hand mount 121b. The double gripper is simultaneously able to pick up the last used tool and the next required tool, so that a tool exchange is possible with only one horizontal movement of the manipulator 120 between spindle 202 and tool magazine 110.

Figure 3:
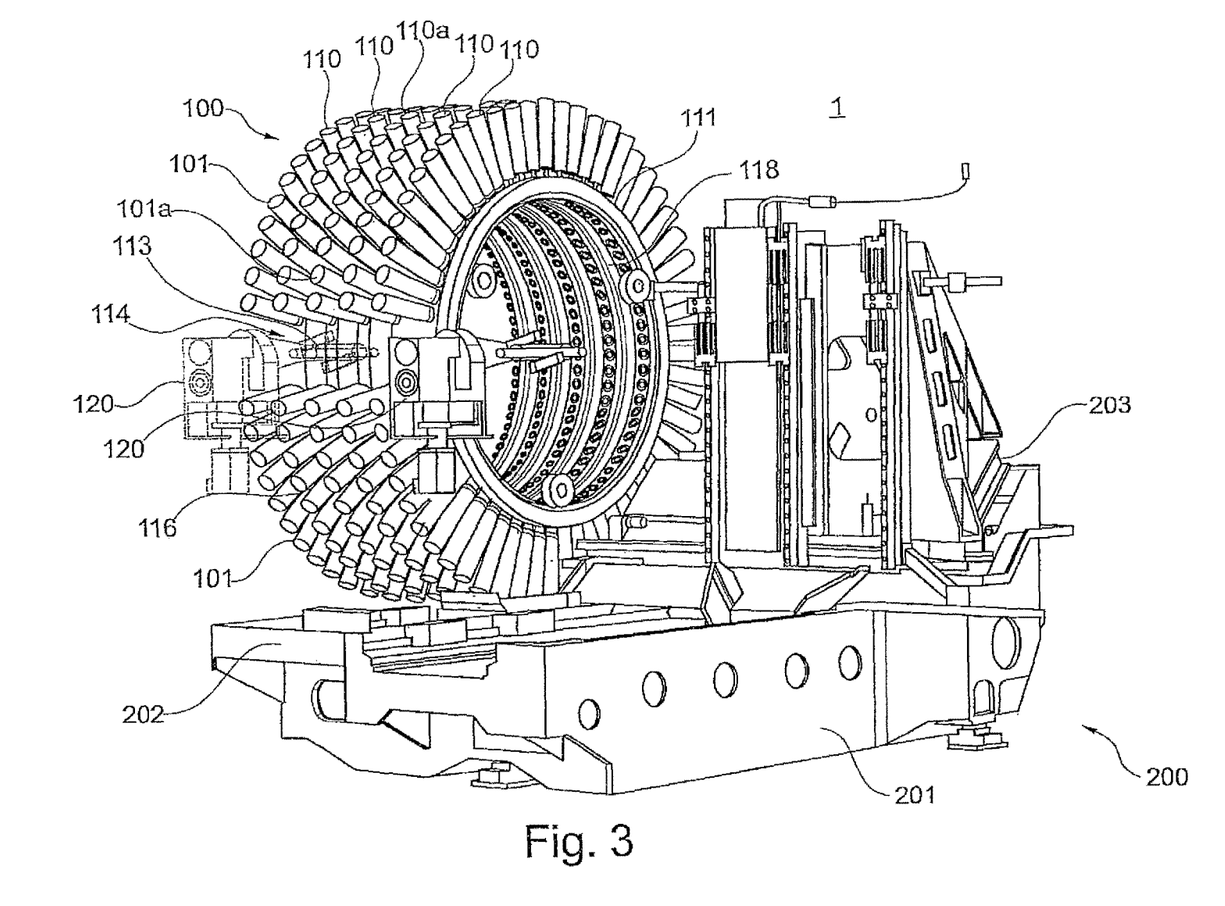
FIG. 3 shows a schematic embodiment with five wheel magazines.

The tool magazine 100 can optionally be equipped with one or more wheel magazines 110. FIG. 3 shows a further embodiment with five wheel magazines. To illustrate the construction principle, in FIG. 3 the other components, such as the drives and the mounting of the wheel magazines 110, the linear axes of the manipulator 120, the control unit for automated tool change and the like, which are configured in the usual manner have not been shown. The mounting of the wheel magazines is indicated schematically by the three bearing points 118. The manipulator 120 is shown in a tool changing position and in a rest position. Each of the wheel magazines 110 has its own drive (not shown) which causes a rotational movement of the wheel magazine about its rotational axis D1. Each wheel magazine 110 can thereby be driven independently of the other wheel magazines 110 to bring the wheel magazine 110 into a desired rotational position in which the required tool can be removed by a manipulator 120.

The three free places 113 positioned next to one another provide an access 114 through which the manipulator 120 can be moved sideways to a specific wheel magazine 110 to remove or replace a required tool 101.

In order for the manipulator 120 to be able to remove a required tool from the tool magazine 100, the following steps are carried out, assuming that the required tool 101a is located in the third tool magazine 110. In this case, first of all the two outer wheel magazines arranged along the rotational axis between the third wheel magazine 110a and the manipulator 120 are rotated about the rotational axis D1 such that the free places thereof 113 are aligned in a predetermined location with respect to the manipulator 120 to allow the manipulator lateral access along the rotational axis to the third wheel magazine 110a. The wheel magazines with the free places are preferably already aligned in this predetermined position as the starting position, so that only the wheel magazine with the required tool ever has to be rotated to position the next required tool 101a in the centre of the access 114.

To remove the tool 101a, the manipulator 120 is then moved in the direction of the rotational axis D1 through the access 114 as far as the third wheel magazine 110a. With a radial gripping movement, the manipulator 120 uncouples the tool 101a in that the manipulator firstly moves radially downwards, clasps the tool on the holder portion thereof using a gripper 121a of the double gripper and uncouples it from the tool mount 112. Thereafter, the radial movement is reversed in order to lift the tool and to then remove it sideways out of the access. The removed tool is then delivered by the manipulator 120 to the tool spindle 202. This is carried out in an automated and program-controlled manner. Depending on the selected mounting of the tools in the tool wheel, the manipulator 120 can also only be equipped with one linear axis L2 in connection with free places, to remove the tools from the wheel magazine 110 with only one sideways movement. Simple, short delivery paths and a fast tool change are made possible particularly combined with the externally arranged manipulator which is moved backwards and forwards only between the working spindle 202 and the wheel magazine 110 to change the tools. As previously mentioned, for this purpose the wheel magazine 110 is rotated about its rotational axis D1 until the tool to be removed is positioned level with the manipulator 120 so that, in an ideal case, the manipulator 120 merely has to perform a horizontal movement to grip the tool and transfer it to the spindle 202.

The present invention allows in particular a set-up in parallel with production time, in which one of the wheel magazines 110 is removed from the tool magazine 100. While the removed wheel magazine 110 is being re-equipped, the system can continue to operate with the other wheel magazines 110.

Figure 4:
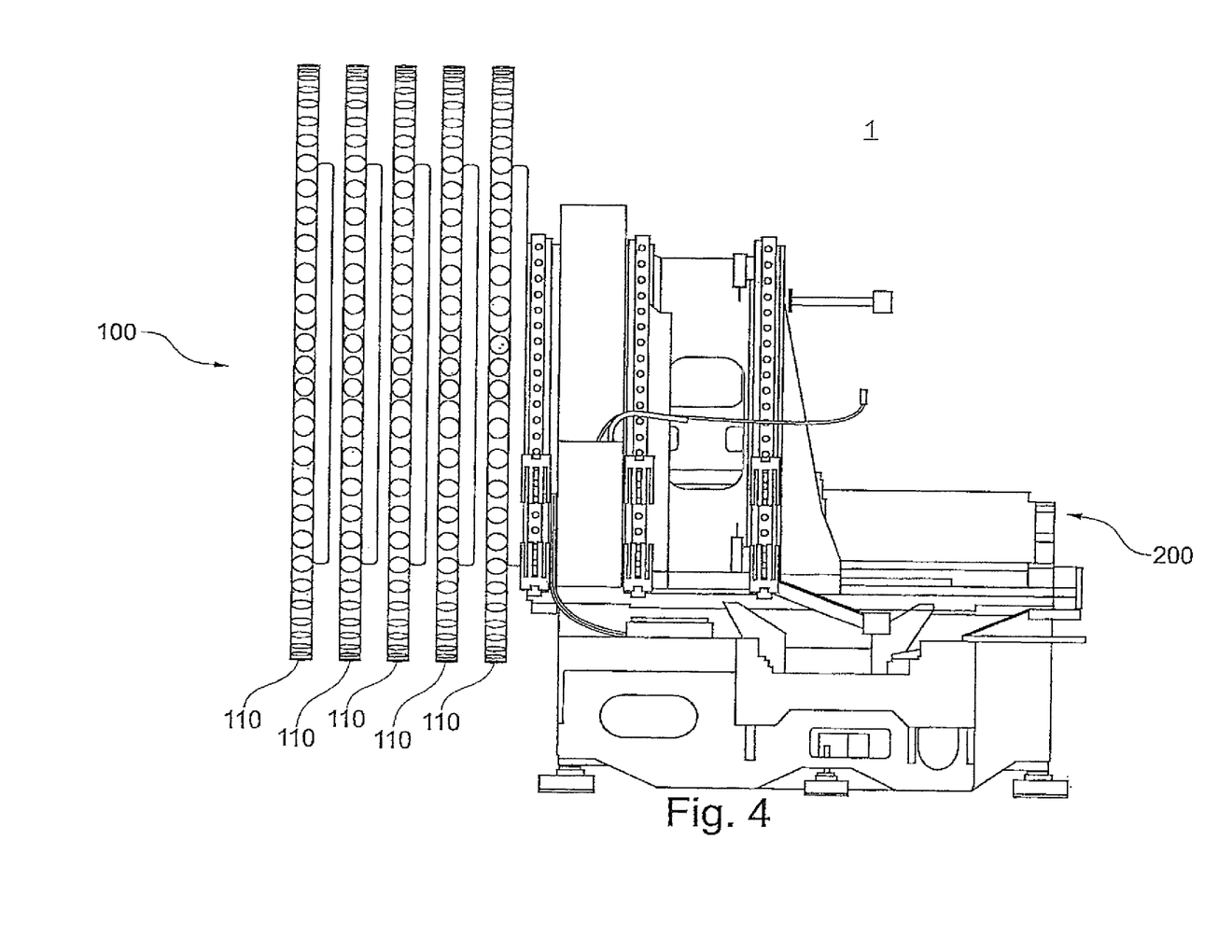
FIG. 4 is a front view of the embodiment from FIG. 3.

FIG. 4 is a front view of the embodiment having five wheel magazines. The illustrated front view clearly shows the narrow overall width of the entire system consisting of machine tool 200 and tool magazine 100 which, in the present example, is only approximately 2.5 m. One wheel magazine has in this case a width of only 180 mm. The tool magazines 100 are arranged sideways in the longitudinal direction of the machine 200, the wheel magazines 110 being arranged vertically to a ground contact area of the machine. Due to the upright arrangement of the wheel magazines, a particularly advantageous small width dimension of the entire system consisting of machine and tool magazine can be realised. With each additional wheel magazine 110, the number of available tool places increases by 60, although the width of the tool magazine increases by only 180 mm in each case.

The invention claimed is:

1. A system for changing and presenting one or more tools of a plurality of tools at a working spindle of a machine tool, the system comprising:

n rotatable tool magazines for receiving the plurality of tools, where n≥2, and the n tool magazines are arranged consecutively along a rotational axis, the rotational axis of the n tool magazines being arranged in a horizontal direction parallel to a floor space on which the machine tool stands, wherein at least one of the n tool magazines can be driven by a drive independently of the other one of the n tool magazines to perform a rotational movement about the rotational axis, and wherein each of the n tool magazines has a respective outer circumferential surface; and a manipulator configured to remove the one or more tools of the plurality of tools from the n tool magazines and to deliver the one or more removed tools to the working spindle of the machine tool, wherein the plurality of tools are held in tool mounts provided in and along the respective outer circumferential surfaces of the n tool magazines such that longitudinal axes of the plurality of tools in each of the n tool magazines are located in a plane and project from the outer circumferential surface of the associated tool magazine of the n tool magazines;

wherein the n tool magazines, or the n tool magazines with the exception of one of the n tool magazines, each have in one location on their respective outer circumferential surfaces a respective free place without tools through which the manipulator can be moved in a first horizontal direction parallel to the horizontal rotational axis of the n tool magazines, wherein to remove the one or more tools of the plurality of tools from a selected tool magazine of the n tool magazines, at least one or more of the n tool magazines which are arranged along the rotational axis between the selected tool magazine and the manipulator are rotated about the rotational axis into a predetermined position such that their free places along the rotational axis provide access for the manipulator to horizontally traverse therethrough via movement of the manipulator in the first horizontal direction, and wherein the manipulator performs a linear horizontal movement in the first horizontal direction through the free places from a position located outside of the n tool magazines, along a passage formed by the free places, and up to the selected tool magazine, and the manipulator performs a linear horizontal movement in the first horizontal direction through the free places from the selected tool magazine to the working spindle of the machine tool to transfer the one or more removed tools to the working spindle of the machine tool and to directly, by the manipulator, deliver the one or more removed tools to the working spindle of the machine tool, the n rotatable tool magazines being arranged such that the working same height above the floor space as a height of the horizontally arranged rotation axis of the n rotatable tool magazines above the floor space.

2. The system according to claim 1, wherein the n tool magazines are arranged such that the planes spanned by the longitudinal axes of the plurality of tools are oriented perpendicular to the floor space.

3. The system according to claim 1, wherein the n tool magazines that have the respective free places are already aligned in the predetermined position as a starting position, so that during a given tool change, only the selected tool magazine with the one or more tools ever has to be rotated to position a next required tool of the one or more tools into the passage.

4. The system according to claim 1, wherein the manipulator removes the one or more tools from the selected tool magazine by a radial gripping movement in a radial direction from the selected tool magazine, and moves sideways out of the n tool magazines via movement in the first direction through the passage.

5. The system according to claim 1, wherein the free places are unequipped tool places.

6. The system according to claim 1, wherein the plurality of tools have respective first longitudinal ends that are received in the tool mounts and second longitudinal ends that are disposed opposite the first longitudinal ends, wherein the second longitudinal ends project outwards from the outer circumferential surfaces of the n tool magazines and the plurality of tools are locked in this position.

7. The system according to claim 1, wherein the n tool magazines are wheel magazines, and the n tool magazines perform a rotational movement about the rotational axis, and the longitudinal axes of the plurality of tools project outwards in a radial direction from the outer circumferential surfaces of the wheel magazines.

8. The system according to claim 7, wherein the wheel magazines each have a respective rotatably mounted annular element in the shape of a hollow cylinder, and on peripheral surfaces of which hole structures are provided as part of the tool mounts to receive the plurality of tools.

9. A machine tool comprising the system according to claim 1, wherein the machine tool has a machine frame and a machine bed, wherein the n tool magazines are arranged in a longitudinal direction of the machine tool.

10. The system according to claim 1, wherein the n rotatable tool magazines form a tool magazine assembly.

11. A machine system for machining a workpiece, comprising:
a machine tool; and
the system according to claim 1.

12. A system for changing and presenting one or more tools of a plurality of tools at a machine tool, the system comprising:
n rotatable tool magazines for receiving the plurality of tools, where n≥2, and the n tool magazines are arranged consecutively along a rotational axis, wherein at least one of the n tool magazines can be driven by a drive independently of the other ones of the n tool magazines to perform a rotational movement about the rotational axis, and wherein each of the n tool magazines has a respective outer circumferential surface; and a manipulator for removing the one or more tools of the plurality of tools from the n tool magazines, wherein the plurality of tools are held in tool mounts provided in and along the respective outer circumferential surfaces of the n tool magazines such that longitudinal axes of the plurality of tools in each of the n tool magazines are located in a plane and project from the outer circumferential surface of the associated tool magazine of the n tool magazines;

wherein with the exception of one of then tool magazines, then tool magazines each have in one location on their respective outer circumferential surfaces a respective free place without tools through which the manipulator can be moved in a first direction parallel to the rotational axis, wherein to remove the one or more tools of the plurality of tools from a selected tool magazine of the n tool magazines, at least one or more of the n tool magazines which are arranged along the rotational axis between the selected tool magazine and the manipulator are rotated about the rotational axis into a predetermined position such that their free places along the rotational axis provide access for the manipulator to traverse therethrough via movement of the manipulator in the first direction, and wherein the manipulator performs a 2-point linear movement through the free places, the manipulator being moved in the first direction from a parking or tool transfer position located outside of the n tool magazines, along a passage formed by the free places, and up to the selected tool magazine and back.

13. A machine system for machining a workpiece, comprising:

a machine tool; and the system according to claim 12.

* * * * *